United States Patent [19]

Nishitani et al.

[11] 4,164,021

[45] Aug. 7, 1979

[54] 2M-POINT DISCRETE FOURIER TRANSFORM CALCULATOR COMPRISING A PRE-PROCESSOR FOR TWICE PERFORMING EXTRACTION OF CONJUGATE SYMMETRIC AND/OR ANTISYMMETRIC COMPONENTS

[75] Inventors: Takao Nishitani; Rikio Maruta, both of Tokyo, Japan

[73] Assignee: Nippon Electric Co., Ltd., Tokyo, Japan

[21] Appl. No.: 839,537

[22] Filed: Oct. 5, 1977

[30] Foreign Application Priority Data

Oct. 6, 1976 [JP] Japan ................................. 51-120630

[51] Int. Cl.² ............................................ G06F 15/34
[52] U.S. Cl. .................................................. 364/726
[58] Field of Search ........................................ 364/726

[56] References Cited

U.S. PATENT DOCUMENTS

| | | | |
|---|---|---|---|
| 3,803,391 | 4/1974 | Vernet | 364/726 |
| 4,051,357 | 9/1977 | Bonnerot | 364/726 |

*Primary Examiner*—David H. Malzahn
*Attorney, Agent, or Firm*—Sughrue, Rothwell, Mion, Zinn and Macpeak

[57] ABSTRACT

An N-point DFT (discrete Fourier transform) calculator comprises a pre-processor responsive to N-point complex input data $F_k$ ($k=0$ to $N-1$) for producing $N/2$-point complex intermediate data $G_p$ ($p=0$ to $N/2-1$) and an $N/2$-point DFT calculating circuit supplied with the intermediate data as $N/2$-point complex input data for producing in a known manner real and imaginary parts $g_q^R$ and $g_q^I$ of DFT's or IDFT's (inverse DFT) $g_q$ ($q=0$ to $N/2-1$) of the latter input data $G_p$ as either real or imaginary parts $f_n^R$ or $f_n^I$ ($n=0$ to $N-1$) of even and odd numbered DFT's or IDFT's $f_{2n'}$ and $f_{2n'+1}$ ($n'=0$ to $N/2-1$) of the original input data $F_k$. The pre-processor extracts from the input data $F_k$ a truncated sequence of conjugate symmetric or antisymmetric components $H_m$, $N/2+1$ in number, extracts from the truncated sequence conjugate symmetric and antisymmetric components $A_p$ and $B_p$, $[N/4]+1$ in number where the brackets are the Gauss' notation, and calculates complex products of ones of the latter components $A_p$ or $B_p$ and factors, such as $j\exp(-j[2\pi/N]p)$ for DFT's or $j\exp(j[2\pi/N]p)$ for IDFT's, sums of the products and the others of the latter components $B_p$ or $A_p$, differences between the products and the others $B_p$ or $A_p$, and conjugate complex data of the differences. For the real parts $f_n^R$, the sums and the conjugate complex data provide the intermediate data. For the imaginary parts $f_n^I$, the differences are used instead of the sums. For factors $\exp(-j[2\pi/N]p)$ or $\exp(j[2\pi/N]p)$, each of the other components $B_p$ or $A_p$ should include a factor $j$.

3 Claims, 8 Drawing Figures

2M-POINT DISCRETE FOURIER TRANSFORM CALCULATOR COMPRISING A PRE-PROCESSOR FOR TWICE PERFORMING EXTRACTION OF CONJUGATE SYMMETRIC AND/OR ANTISYMMETRIC COMPONENTS

BACKGROUND OF THE INVENTION

This invention relates to an N-point discrete Fourier transform calculator. The calculator is for calculating discrete Fourier transforms (hereafter abbreviated to DFT) of a sequence of N-point discrete samples. Inasmuch as calculation of inverse discrete Fourier transforms (hereafter abbreviated to IDFT) of DFT's is similar in nature as will later be described, the calculator is capable of calculating also IDFT's. The number of points N is herein equal to an even number and therefore to 2M, where M represents an integer.

DFT is known as a mathematical operation for finding a frequency spectrum of a sequence of a finite number of discrete signals and is useful in digitally processing the signals. For example, a DFT calculator is used as a digital spectrum analyser and a digital filter. DFT calculators are used also in modulators and demodulators of a transmultiplexer for interconnecting a time division multiplex (TDM) network and a frequency division multiplex (FDM) network.

A sequence of DFT's $F_k$ ($k=0, 1, \ldots$, and $N-1$) of a sequence of N-point discrete samples $f_n$ ($n=0, 1, \ldots$, and $N-1$) is defined by:

$$F_k = \sum_{n=0}^{N-1} f_n \cdot \exp[-j(2\pi/N)kn]. \tag{1}$$

IDFT is an inverse operation of DFT. Namely, a sequence of IDFT's $f_n$ of the DFT's $F_k$ is calculated according to:

$$f_n = (1/N) \cdot \sum_{k=0}^{N-1} F_k \cdot \exp[j(2\pi/N)kn]. \tag{2}$$

As regards the type of calculation, Equations (1) and (2) are equivalent to each other except for the factor $1/N$ and the sign of the argument of the exponential function. It is therefore possible to use a DFT calculator both for DFT's and IDFT's as mentioned hereinabove. Due to periodic nature of the discrete values $f_n$ and $F_k$, it is possible to regard $f_N$ and $F_N$ to be equal to $f_0$ and $F_0$, respectively.

Merely for convenience of description, let use be made, instead of Equations (1) and (2), of:

$$f_n = \sum_{k=0}^{N-1} F_k \cdot \exp[j(2\pi/N)kn]. \tag{3}$$

It should be pointed out here that multiplication has had to be carried out N times in order to calculate Equation (3) for a particular value of the ordinal numbers n used to generally represent any member of the DFT's or IDFT's. It is therefore mandatory to perform multiplication $N^2$ times for all discrete samples $f_n$. With an increase in the number of points N, the number of times of multiplication grows quadratically so as to render a real-time DFT calculator inhibitingly bulky.

In various publications, fast Fourier transform (hereafter abbreviated to FFT) calculators are described. An FFT calculator is usable when the number of points N is divisible into products of integers. An example of such publications is a book entitled "Theory and Application of Digital Signal Processing" written by L. R. Babiner and B. Gold and published by Prentice-Hall, Inc., of New Jersey, U.S.A., pages 598 to 626. According to FFT, it is possible to materially reduce the number of times of multiplication. Particularly when the number of points N is given by a power to two $2^n$ (the letter "n" being used for the time being with no connection to the letter "n" used elsewhere in the instant specification to generally represent the ordinal numbers of the discrete samples), the number of times of multiplication is reduced to $(N/2) \log_2 N$ and, in practice, to $(N/2)(\log_2 N - 2)$ because two of $\log_2 N$ stages of the multiplication are mere multiplication by 1 and j, respectively.

Both the input discrete samples $F_k$ of a sequence supplied to a DFT calculator and the output DFT's or IDFT's $f_n$ are given by complex data in general. It is, however, often the case that the input data are limited to real data and/or that only real parts are necessary among the complex output data. Even in such a case, it has been infeasible to reduce the number of times of multiplication with a conventional DFT calculator. Inasmuch as a speed of arithmetic operation of a digital system is dependent on the number of times of multiplication, it has been impossible to improve the speed with a conventional DFT calculator. This applies to power consumption of the digital system.

SUMMARY OF THE INVENTION

It is therefore an object of the present invention to provide an N-point DFT calculator whereby it is possible to materially reduce the number of times of multiplication when either real or imaginary parts of output complex data are necessary. The letter "N" represents an even number.

It is another object of this invention to provide a compact and economical DFT calculator of the type described.

It is still another object of this invention to provide a high-speed DFT calculator of the type described.

It is yet another object of this invention to provide a DFT calculator of the type described, which is operable with a less power consumption.

According to this invention, there is provided a DFT calculator responsive to a sequence of N-point discrete complex input data, where N is representative of an even number, for producing a prescribed one of a sequence of real parts of N-point DFT's of the input data, a sequence of imaginary parts of the DFT's, a sequence of real parts of N-point IDFT's of the input data, and a sequence of imaginary parts of the IDFT's. The calculator comprises a pre-processor responsive to the input data for producing a sequence of N/2-point complex intermediate data and an N/2-point DFT calculating circuit having real output terminals, N/2 in number, and imaginary output terminals, also N/2 in number, responsive to the N/2-point complex intermediate data supplied thereto as N/2-point complex input data for supplying the real and imaginary output terminals with the transforms of the prescribed sequence. The pre-processor comprises, in turn, first means for extracting from the input data a truncated sequence of first conjugate components of one of symmetry and antisymmetry that is selected according as the real parts of the DFT's and the IDFT's are to be produced and the imaginary parts of the DFT's and the IDFT's are to be produced, respectively, second means for extracting from the first conjugate components a symmetric sequence of second conjugate components and an antisymmetric sequence of second conjugate components, and third means for calculating complex products of factors selected according as the real and imaginary parts of the DFT's and the real and imaginary parts of the IDFT's are to be produced and the second conjugate components of one of the symmtric and antisymmetric sequences that is selected according as the real parts of the DFT's and the IDFT's and the imaginary parts of the DFT's and the IDFT's are to be produced, respectively, first algebraic sums of the complex products and the respective second conjugate components of the other of the symmetric and antisymmetric sequences, second algebraic sums of the complex products and the respective second conjugate components of the above-mentioned other sequence, and conjugate complex data of the second algebraic sums. The first algebraic sums and the conjugate complex data provide the N/2-point complex intermediate data.

DESCRIPTION OF THE PREFERRED EMBODIMENTS

Figure 1:
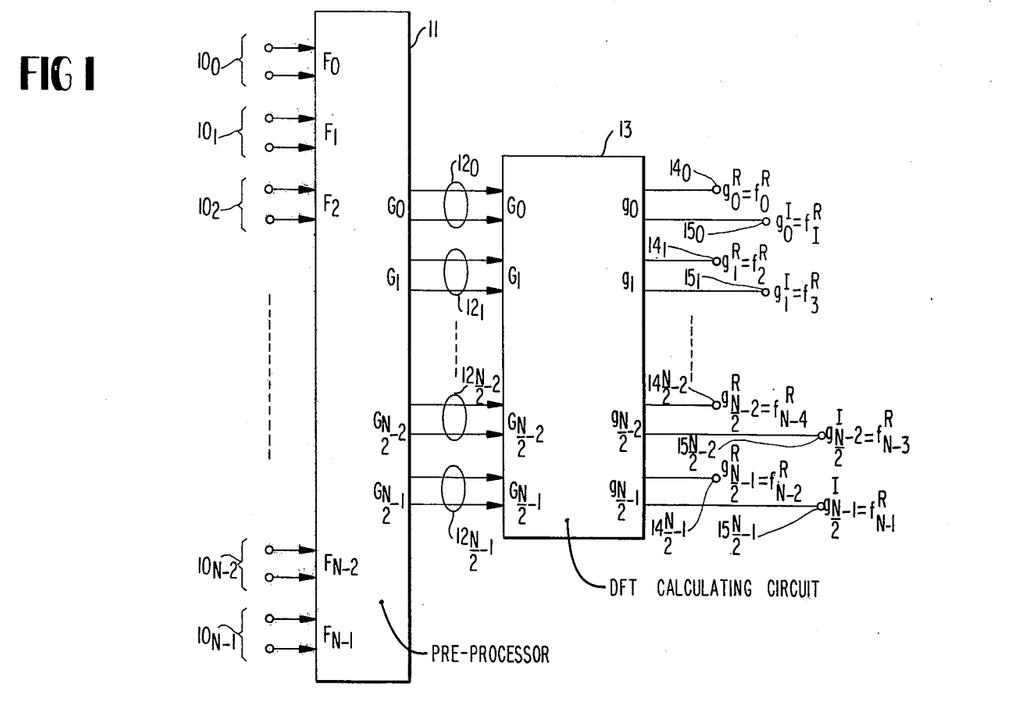
FIG. 1 is a block diagram of a DFT calculator according to a first embodiment of the present invention.

Referring to FIG. 1, an N-point DFT calculator according to a first embodiment of the present invention is for carrying out IDFT defined by Equation (3) hereinabove. The calculator comprises a plurality of input terminals $10_0$, $10_1$, $10_2$, ..., $10_{N-2}$, and $10_{N-1}$ for a sequence of N-point complex input data $F_k$ (k=0, 1, 2, ..., N−2, and N−1), a pre-processor 11 responsive to the input data $F_k$ for supplying a plurality of output leads $12_0$, $12_1$, ..., $12_{N/2-2}$, and $12_{N/2-1}$ with a sequence of N/2-point complex intermediate data $G_p$ (p=0, 1, ..., N/2−2, and N/2−1) in a manner described later, and an N/2-point DFT calculating circuit 13 for calculating IDFT's $g_q$ (q=0, 1, ..., N/2−2, and N/2−1) of the intermediate data $G_p$ supplied thereto as a sequence of N/2-point complex input data to deliver real parts $g_q^R$ and imaginary parts $g_q^I$ of the calculated IDFT's $g_q$ to real output terminals $14_0$, $14_1$, ..., $14_{N/2-2}$, and $14_{N/2-1}$ and imaginary output terminals $15_0$, $15_1$, ..., $15_{N/2-2}$, and $15_{N/2-1}$, respectively. As the DFT calculating circuit 13, use is possible of a known DFT calculator, such as an FFT calculator described in the above-referenced book with reference to FIG. 10.20 thereof, page 599. As will later be evidenced, the real and imaginary parts $g_q^R$ and $g_q^I$ are equal to real parts $f_n^R$ of a sequence of complex output data $f_n$ given by:

$$f_n^R = Re[\sum_{k=0}^{N-1} F_k \cdot \exp(j[2\pi/N]kn)]. \quad (4)$$

According to a first aspect of the first embodiment, the pre-processor 11 derives the N/2-point intermediate data $G_p$ from the N-point complex input data $F_k$ in compliance with:

$$\left. \begin{array}{l} G_p = A_p + jB_p \cdot \exp(j[2\pi/N]p) \\ \text{and} \\ G_{N/2-p} = [A_p - jB_p \cdot \exp(j[2\pi/N]p)]^* \end{array} \right\} \quad (5)$$

for p=0, 1, ..., and N/4, where the asterisk represents conjugate complex data and where:

$$\left. \begin{array}{l} A_p = H_p + H_{N/2-p}^* \\ \text{and} \\ B_p = H_p - H_{N/2-p}^* \end{array} \right\} \quad (6)$$

for p=0, 1, ..., and N/4, where, in turn:

$$H_m = (\tfrac{1}{2})(F_m + F_{N-m}^*) \quad (7)$$

for m=0, 1, ..., and N/2. As implied by the number designated by N/4, it is presumed here that the number N/4 is an integer. In other words, the number of points N of the input data $F_k$ is assumed to be equal to an even integral multiple of two. It is readily understood that the intermediate datum $G_{N/4}$ appears in both former and latter halves of Equation (5) and that $A_p = A_{N/2-p}^*$, $B_p = -B_{N/2-p}^*$, and $H_m = H_{N-m}^*$. Inasmuch as conjugate complex data, such as $F_{N-m}^*$, are derivable by mere inversion of the polarity of signals representative of the imaginary parts, multiplication is necessary, throughout calculation of Equations (5) through (7), only in calculating Equation (5). Physical meaning of complex data $A_p$, $B_p$, and $H_m$ will become clear as the description proceeds. Description will appear also hereunder as regards a case where the number of points N is equal to an odd integral multiple of two so that the number N/4 is not an integer.

Responsive to the complex intermediate data $G_p$, the DFT calculating circuit 13 calculates the IDFT's $g_q$ according to:

$$g_q = \sum_{p=0}^{N/2-1} G_p \cdot \exp(j[2\pi/(N/2)]pq) \quad (8)$$

for q=0, 1, ..., and N/2−1. The IDFT's $g_q$ are related to the real parts of $f_n^R$ of the complex output data $f_n$ to be derived by Equation (4) as follows:

$$f_{2n'}^R = Re[g_q] = g_q^R \quad (9)$$

and $$f_{2n'+1}^R = Im[g_q] = g_q^I \quad (10)$$

for n'=0, 1, ..., and N/2−1.

In order to prove the fact that Equations (9) and (10) are correct, Equations (6) and (7) are substituted into Equation (5). The former half of Equation (5) is:

$$G_p = (F_p + F_{N-p}^*)/2 + (F_{N/2-p}^* + F_{N/2+p})/2 + j[(-F_p + F_{N-p}^*)/2 - (F_{N/2-p}^* + F_{N/2+p})/2] \times \exp(j[-2\pi/N]p) \quad (11)$$

for $p = 0, 1, \ldots,$ and $N/4$. Likewise, the latter half is:

$$G_r = [(F_{N/2-r} + F_{N/2+r}^*)/2 + (F_r^* + F_{N-r})/2 - j[(-F_{N/2-r} + F_{N/2+r}^*)/2 - [F_r^* + F_{N-r}]/2) \times \exp(j[-2\pi/N]r)]^*, \quad (12)$$

where $r = N/2 - p$. From Equations (11) and (12), the whole Equation (5) turns into a single equation such that:

$$G_p = [(F_p + F_{N-p}^*) + (F_{N/2-p}^* + F_{N/2+p}) - j([F_p + F_{N-p}^*] - [F_{N/2-p}^* + F_{N/2+p}]) \times \exp(j[2\pi/N]p)]/2 \quad (13)$$

for $p = 0, 1, \ldots,$ and $N/2 - 1$. By substituting Equation (13) into Equation (8) and by rewriting two of the terms which appear in the substituted equation by the readily appreciable relations such that:

$$\sum_{p=0}^{N/2-1} (F_{N/2-p} + F_{N/2+p}^*) \cdot \exp(j[2\pi/N][2n]p) = \sum_{p=N/2}^{N-1} (F_p + F_{N-p}^*) \cdot \exp(j[2\pi/N][2n]p)$$

and $$-j \sum_{p=0}^{N/2-1} (F_{N/2-p}^* + F_{N/2+p}) \cdot \exp(j[2\pi/N][2n+1]p) = j \sum_{p=N/2}^{N-1} (F_p + F_{N-p}^*) \cdot \exp(j[2\pi/N][2n+1]p),$$

then the calculated IDFT's $g_q$ are given by:

$$g_q = (\tfrac{1}{4})[\sum_{p=0}^{N-1} (F_p + F_{N-p}^*) \cdot \exp(j[2\pi/N][2n]p) + j \sum_{p=0}^{N-1} (F_p + F_{N-p}^*) \cdot \exp(j[2\pi/N][2n+1]p)].$$

The conjugate complex IDFT's $g_q^*$ are:

$$g_q^* = (\tfrac{1}{4})[\sum_{p=0}^{N-1} (F_p^* + F_{N-p}) \cdot \exp(-j[2\pi/N][2n]p) - j \sum_{p=0}^{N-1} (F_p^* + F_{N-p}) \cdot \exp(-j[2\pi/N][2n+1]p)].$$

The real and imaginary parts of the calculated IDFT's $g_q$ are therefore:

$$Re[g_q] = (g_q + g_q^*)/2 \quad (14)$$
$$= (\tfrac{1}{4})[\sum_{k=0}^{N-1} F_k \cdot \exp(j[2\pi/N][2n]k) + \sum_{k=0}^{N-1} F_k^* \cdot \exp(-j[2\pi/N][2n]k)]$$
$$= Re[\sum_{k=0}^{N-1} F_k \cdot \exp(j[2\pi/N][2n]k)]$$

and $$Im[g_q] = (g_q - g_q^*)/(2j) \quad (15)$$
$$= (\tfrac{1}{4})[\sum_{k=0}^{N-1} F_k \cdot \exp(j[2\pi/N][2n+1]k) + \sum_{k=0}^{N-1} F_k^* \cdot \exp(-j[2\pi/N][2n+1]k)]$$
$$= Re[\sum_{k=0}^{N-1} F_k \cdot \exp(j[2\pi/N][2n+1]k)].$$

Comparison of Equations (14) and (15) with Equation (4) readily shows that Equations (9) and (10) are correct.

The number of times of multiplication is $N/4$ in the pre-processor 11 and, for the number of points N given by a power to two, $(N/4) \times (\log_2[N/2] - 2)$ in the $N/2$-point DFT calculating circuit 13. The total is $(N/4)(\log_2 N - 2)$ times, which are a half of the number of multiplications indispensable when an N-point DFT calculating circuit is directly applied to the complex input data $F_k$.

According to a second aspect of the first embodiment, the pre-processor 11 derives the $N/2$-point complex intermediate data $G_p$ from the N-point complex input data $F_k$ in compliance with:

$$\left.\begin{array}{l} G_p' = jA_p + B_p \cdot \exp(j[2\pi/N]p) \\ \text{and} \\ G_{N/2-p}' = [-jA_p + B_p \cdot \exp(j[2\pi/N]p)]^* \end{array}\right\} \quad (5')$$

for $p = 0, 1, \ldots,$ and $N/4$. Under the circumstances, the $N/2$-point DFT calculating circuit 13 produces the calculated IDFT's $g_q$ which are related to the real parts of the complex output data $f_n$ to be derived from Equation (4) by:

$$f_{2n'}{}^R = g_q{}^I$$

and $$f_{2n'+1}{}^R = g_q{}^R$$

for $n' = 0, 1, \ldots,$ and $N/2 - 1$.

For an N-point DFT calculator according to the second aspect, it may seem that an additional multiplication is necessary in calculating a product $jA_p$ in Equation (5'). The fact is, however, the product in question is calculated in effect by interchanging the real and imaginary parts and by inverting the polarity of the new real part derived from the original imaginary part. The multiplications necessary for the pre-processor 11 in a DFT calculator according to the second aspect is therefore also $N/4$ times.

In modifications of the calculators according to the first and second aspects of the first embodiment, both complex data $A_p$ and $B_p$ for $p = 0, 1, \ldots,$ and $N/4$ are multiplied by $(-1)$. More particularly, use is made of a pair of halves of an equation such that:

$$\left.\begin{array}{l} G_p'' = -A_p - jB_p \cdot \exp(j[2\pi/N]p) \\ \text{and} \\ G_{N/2-p}'' = -[A_p - jB_p \cdot \exp(j[2\pi/N]p)]^* \end{array}\right\} \quad (5'')$$

instead of Equation (5). In this event, the polarities of the respective calculated IDFT's $g_q$ are inversed. Therefore, the real parts $f_n{}^R$ are given by:

$$-f_{2n'}{}^R = g_q{}^R$$

and $$-f_{2n'+1}{}^R = g_q{}^I.$$

When use is made, instead of Equation (5'), of another pair of halves of an equation similar to Equation (5''), the real parts $f_n^R$ are given by:

$$-f_{2n'}{}^R = g_q{}^I$$

and $$-f_{2n'+1}{}^R = g_q{}^R.$$

An N-point DFT calculator according to a second embodiment of this invention produces the imaginary parts $f_n^I$ of the IDFT's $f_n$ defined by an equation corresponding to Equation (4). The pre-processor 11 derives N/2-point complex intermediate data $G_p{}^a$ from the N-point complex input data $F_k$ in accordance with:

$$\left.\begin{array}{l} G_p{}^a = A_p \cdot \exp(j[2\pi/N]p) - jB_p \\ \text{and} \\ G_{N/2-p}{}^a = [-A_p \cdot \exp(j[2\pi/N]p) - jB_p]^* \end{array}\right\} \quad (5a)$$

for p=0, 1, ..., and N/4. Instead of the complex data $H_m$ calculated by Equation (7), use is made, in calculating the complex data $A_p$ and $B_p$, of similar data $H_m{}^a$ given by:

$$H_m{}^a = (\tfrac{1}{2})(F_m - F_{N-m}{}^*) \quad (7a)$$

for m=0, 1, ..., and N/2. The N/2-point DFT calculating circuit 13 produces calculated IDFT's $g_q{}^a$ which are related to the imaginary parts $f_n^I$ by:

$$f_{2n'}{}^I = Im[g_q{}^a]$$

and $$f_{2n'+1}{}^I = Re[g_q{}^a].$$

It is now obvious that use is possible of a pair of halves of an equation which is similar to Equation (5a) and corresponds to Equation (5'), (5''), or the like. When unnecessary, primes and affixes "a" will be omitted from the complex data $G_p$, $H_m$, and the like.

As pointed out hereinabove, an N-point DFT calculator according to this invention is capable of calculating DFT's $f_n$ of a sequence of complex input data $F_k$. In this event, the arguments of the exponential functions in Equation (4) or the above-mentioned equation corresponding thereto should have minus signs. It is therefore sufficient to merely inverse the signs of the arguments of the exponential functions dealt with in the pre-processor 11 and the N/2-point DFT calculating circuit 13.

Figure 3A:
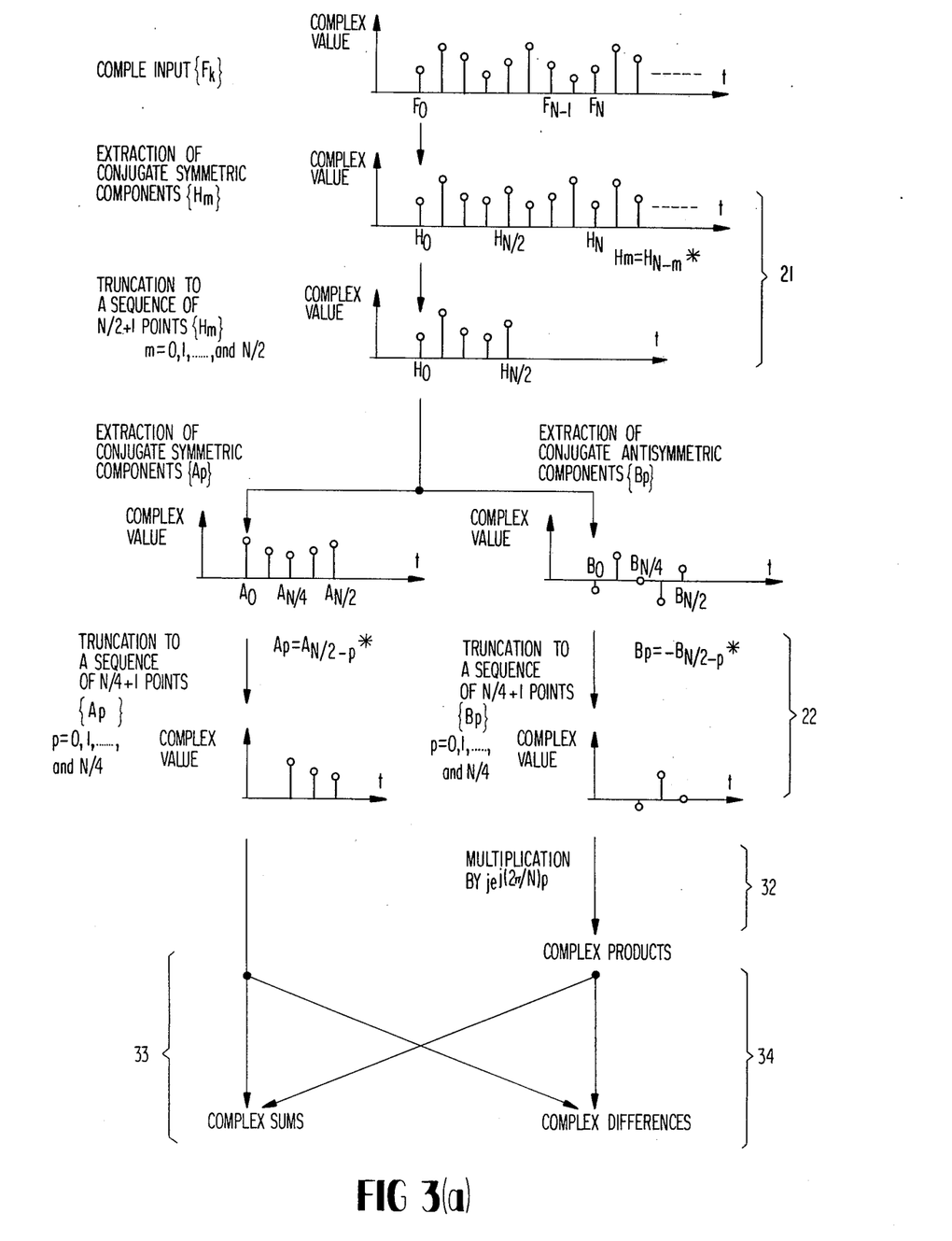
FIGS. 3(a) and (b) cooperate with each other to schematically show a flow of signals in the DFT calculator depicted in FIG. 1 and comprising the pre-processor exemplified in FIG. 2.
Figure 3B:
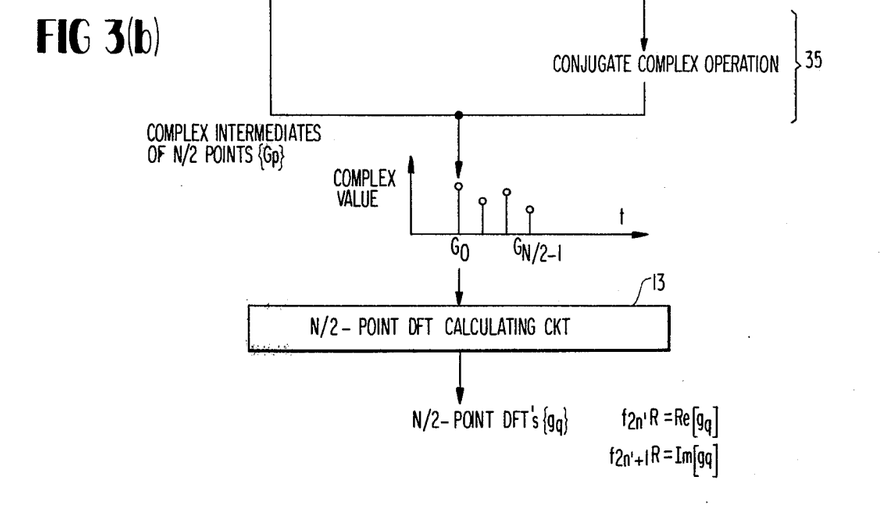

Referring temporarily to FIG. 3(a) wherein the number of points N of the complex input data $F_k$ is surmised to be eight, complex data $A_p$ (p=0, 1, ..., and N/4), N/4+1 in number, used in Equation (5), (5'), (5''), (5a), or the like are given by a former half of a whole sequence of conjugate symmetric components having an axis of symmetry coincident with a bisector of the whole sequence. Other complex data $B_p$ are similarly given by a former half of an entire sequence of conjugate antisymmetric components having a center of symmetry at a point of bisect of the entire sequence. Complex data $H_m$ (m=0, 1, ..., and N/2), N/2+1 in number, calculated in compliance with Equation (7) are given by a former half of a complete sequence of conjugate symmetric components while complex data $H_m$ defined by Equation (7a), by a former half of another complete sequence of conjugate antisymmetric components. Due to symmetricalness, use is possible of conjugate symmetric and antisymmetric components $H_{N/2+m}$ or $H_{N-m}$ of latter halves of the respective complete sequences. It may therefore be permissible that the latter components $H_{N-m}$ are also represented by $H_m$ because of the equivalency and that the sequences of the conjugate symmetric and antisymmetric components $H_m$ are called truncated sequences of first conjugate components $H_m$ of symmetry and antisymmetry, respectively. Use is also possible of conjugate symmetric and antisymmetric components $A_{N/2-p}$ and $B_{N/2-p}$, $A_{N/2+p}$ and $B_{N/2+p}$, or $A_{N-p}$ and $B_{N-p}$. It may therefore be permissible to designate the latter components $A_{N/2-p}$, $B_{N/2-p}$, and so forth again by $A_p$ and $B_p$ and to call the sequences of the conjugate symmetric and antisymmetric components $A_p$ and $B_p$ a symmetric sequence of second conjugate components $A_p$ and an antisymmetric sequence of second conjugate components $B_p$. The symmetric and antisymmetric sequences are also truncations from the whole and entire sequences of components $A_p$ and $B_p$ (p=0 to N/2) named hereinabove. It is therefore possible, as the case may be, to term the truncated sequence of first conjugate components $H_m$ of symmetry or antisymmetry and the symmetric and antisymmetric sequences a first truncated sequence of conjugate symmetric or antisymmetric components $H_m$, a second truncated sequence of conjugate symmetric components $A_p$, and a second truncated sequence of conjugate antisymmetric components $B_p$.

Figure 4:
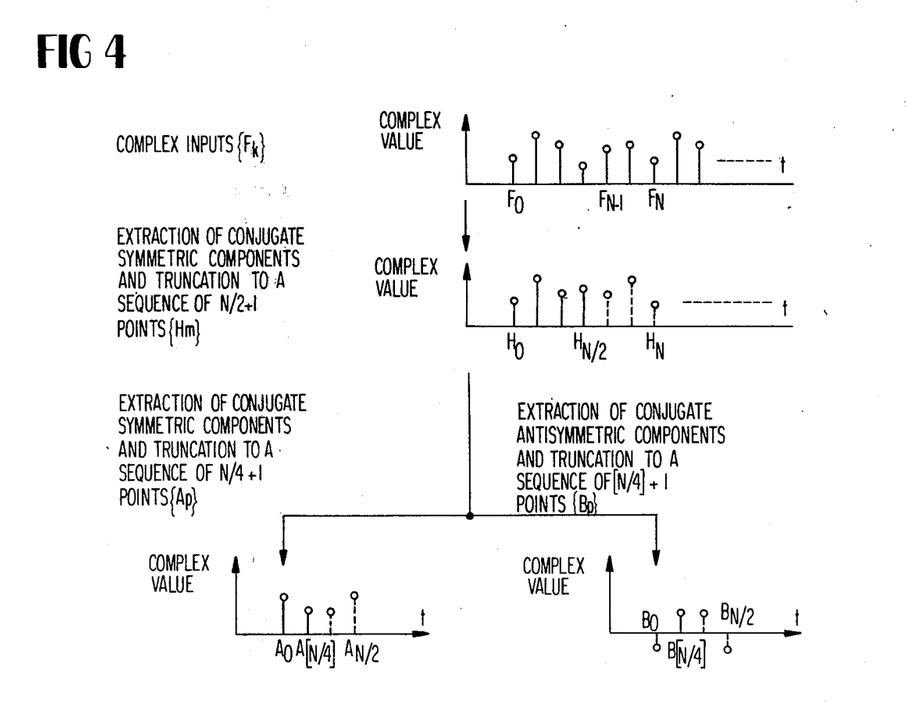
FIG. 4 schematically shows a portion of the signal flow which is somewhat different from that depicted in FIG. 3(a)

Turning now to FIG. 4 wherein the number of points N is equal to an odd integral multiple of two, such as six, the suffixes "p" in Equations (5) and (6) should be 0, 1, ..., and (N−2)/4 instead of 0, 1, ..., and N/4. It follows therefore that each of the symmetric and antisymmetric sequences consists of the second conjugate components $A_p$ or $B_p$, (N−2)/4+1 in number, although the truncated sequence consists of the first conjugate components $H_m$, N/2+1 in number. As an eventual consequence, the discussions described hereinabove, those for Equation (8) and so forth inclusive, apply if the number N/4 used when the number of points N is equal to an even integral multiple of two is rewritten to [N/4] where a pair of brackets is the Gauss' notation known in mathematics.

With reference to a DFT calculator according to the first embodiment of this invention and exemplified in FIG. 1, it is now understood that a DFT calculator according to this invention is responsive to a sequence of N-point complex input data $F_k$ for producing a prescribed one of a sequence of real parts $f_n^R$ of DFT's of the input data $F_k$, a sequence of imaginary parts $f_n^I$ of the DFT's, a sequence of real parts $f_n^R$ of IDFT's of the input data $F_k$, and a sequence of imaginary parts $f_n^I$ of the IDFT's (k=0, 1, ..., and N−1, n=0, 1, ..., and N−1, where N represents an even number). The pre-processor 11 carries out extraction, from the input data $F_k$ according to Equation (7) or (7a), of a truncated sequence of first conjugate components $H_m$ or $H_{N-m}$ (m=0, 1, ..., and N/2) of one of symmetry and antisymmetry that is selected according as the real parts $f_n^R$ of the DFT's or IDFT's are to be produced and the imaginary parts $f_n^I$ thereof are to be produced, respectively. In compliance with Equation (6), the pre-processor 11 carries out extraction, from the truncated sequence, of a symmetric sequence of second conjugate components $A_p$, $A_{N/2-p}$, $A_{N/2+p}$, or $A_{N-p}$ and an antisymmetric sequence of second conjugate components $B_p$, $B_{N/2-p}$, $B_{N/2+p}$, or $B_{N-p}$ ($p = 0, 1, \ldots,$ and $[N/4]$). The first conjugate components $H_m$ or $H_{N-m}$ are generally represented by $H_m$ as noted hereinabove. Similarly, the second ones $A_p$ and $B_p$ or the like are represented by $A_p$ and $B_p$ in general.

In preparation for calculation of Equation (5), (5'), (5''), (5a), or the like, the pre-processor 11 calculates complex products of predetermined factors and the second conjugate components of one of the symmetric and antisymmetric sequences $A_p$ or $B_p$ that is selected according as the real parts $f_n^R$ of the DFT's or IDFT's and the imaginary parts $f_n^I$ thereof are to be produced, respectively. Generally speaking, the predetermined factors are $j\exp(-j[2\pi/N]p)$ and $j\exp(j[2\pi/N]p)$ according as the DFT's and the IDFT's are to be calculated, respectively. In order to calculate the former half of Equation (5), (5'), (5''), (5a), or the like, the pre-processor 11 calculates first algebraic sums of the complex products and the respective second conjugate components of the other of the symmetric and antisymmetric sequences $B_p$ or $A_p$. The first algebraic sums are complex arithmetic sums and differences when the real parts $f_n^R$ and the imaginary parts $f_n^I$ of the DFT's or IDFT's are to be derived, respectively. For the latter half of Equation (5) or the like, the pre-processor 11 calculates second algebraic sums of the complex products and the last-mentioned components $B_p$ or $A_p$. The second algebraic sums are complex arithmetic differences and sums when the first ones are the arithmetic sums and differences, respectively. The pre-processor 11 further calculates conjugate complex data of the second algebraic sums. Alternatively, the predetermined factors are $\exp(-j[2\pi/N]p)$ and $\exp(j[2\pi/N]p)$. In this event, each of the second conjugate components of the unselected sequence $B_p$ or $A_p$ should include a factor $j$. If it is desired to derive negative real or imaginary parts $-f_n^R$ or $-f_n^I$ of the DFT's or IDFT's of the input data $F_k$ according to Equation (5'') or its equivalent, each of the second conjugate components of both sequences $A_p$ and $B_p$ should include a factor $(-1)$. At any rate, the first algebraic sums and the conjugate complex data provide N/2-point complex intermediate data $G_p$ ($p = 0, 1, \ldots,$ and $N/2$) among which the intermediate datum $G_{N/2} = G_0$ is redundant because $G_{N/2} = G_0$.

Being a known DFT calculator, the N/2-point DFT calculating circuit 13 has real output terminals $14_q$ and imaginary output terminals $15_q$ ($q = 0, 1, \ldots,$ and $N/2-1$). Supplied with the N/2-point intermediate data $G_p$ ($p = 0, 1, \ldots,$ and $N/2-1$) as a sequence of N/2-point complex input data, the circuit 13 carries out known DFT and IDFT of the latter input data $G_p$ to deliver real and imaginary parts $g_q^R$ and $g_q^I$ of the DFT's or IDFT's $g_q$ to the real and imaginary output terminals $14_q$ and $15_q$, respectively. According to Equation (9) and (10) or the like, the real and imaginary parts $g_q^R$ and $g_q^I$ give even and odd numbered real parts $f_{2n'}^R$ and $f_{2n'+1}^R$ or imaginary parts of $f_{2n'}^I$ and $f_{2n'+1}^I$ of DFT's or IDFT's $f_n$ of the N-point input data $F_k$.

Figure 2:
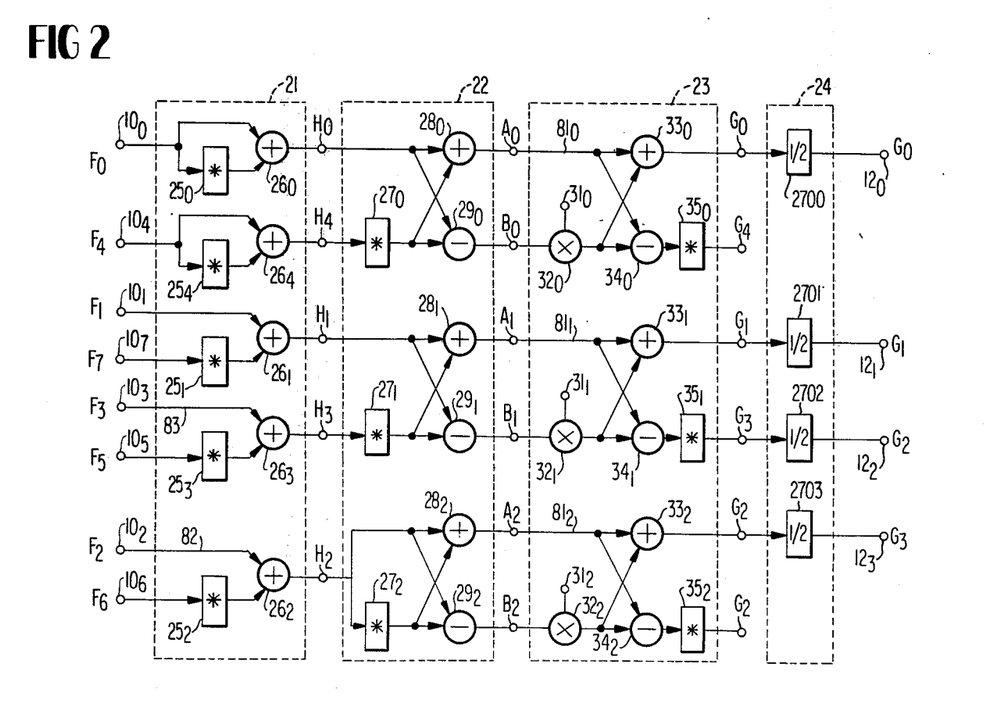
FIG. 2 exemplifies in blocks a pre-processor for use in the DFT calculator illustrated in FIG. 1.

Referring now to FIG. 2 and FIGS. 3(a) and (b), a pre-processor 11 for use in a DFT calculator according to the first embodiment of this invention is for eight-point complex input data $F_k$ ($k = 0, 1, \ldots,$ and 7). The pre-processor 11 has input terminals $10_k$ for the respective input data $F_k$ and output leads $12_p$ for four-point complex intermediate data $G_p$ ($p = 0, 1, 2,$ and 3), respectively. The pre-processor 11 comprises a first conjugate component extractor 21 for extracting a truncated sequence of first conjugate components $H_m$ ($m = 0, 1, \ldots,$ and 4) from the input data $F_k$, a second conjugate component extractor 22 for extracting a symmetric sequence of second conjugate components $A_p$ and an antisymmetric sequence of second conjugate components $B_p$ ($p = 0, 1,$ and 2) from the truncated sequence, a complex arithmetic unit 23 for calculating complex products of the second conjugate components of the antisymmetric sequence $B_p$ and predetermined factors $j\exp(j[2\pi/N]p)$, complex arithmetic sums of the products and the respective second conjugate components of the symmetric sequence $A_p$, complex differences given by subtracting the respective products from the latter components $A_p$, and conjugate complex data of the respective differences, and a scaling circuit 24 for multiplying selected ones of the sums and the conjugate complex data by preselected constants, such as $\frac{1}{2}$, to supply the intermediate data $G_p$ to the output leads $12_p$. In FIGS. 3(a) and (b), the input data $F_k$ and the like are depicted together with the units, including the N/2-point DFT calculating circuit 13, for processing various data. It will be seen that the data $F_7$, $G_3$, $H_4$, $A_2$, and $B_2$ are designated by $F_{N-1}$, $G_{N/2-1}$, $H_{N/2}$, $A_{N/4}$, and $B_{N/4}$ in FIG. 3.

Referring more particularly to FIG. 2, the first conjugate component extractor 21 comprises a zeroth conjugate complex circuit $25_0$ responsive to the zeroth input datum $F_0$ for producing the conjugate complex datum $F_0^*$ thereof, namely, $F_{8-0}^*$, a first conjugate complex circuit $25_1$ responsive to the seventh input datum $F_7$ for producing the conjugate complex datum $F_7^*$ or $F_{8-1}^*$, a second conjugate complex circuit $25_2$ responsive to the sixth input datum $F_6$ for producing the conjugate complex datum $F_6^*$ or $F_{8-2}^*$ a third conjugate complex circuit $25_3$ responsive to the fifth input datum $F_5$ for producing the conjugate complex datum $F_5^*$ or $F_{8-3}^*$, a zeroth complex adder $26_0$ for adding the zeroth input datum $F_0$ and the conjugate complex datum $F_{8-0}^*$ produced by the zeroth conjugate complex circuit $25_0$ to produce a zeroth total $2H_0$ according to Equation (7), a first complex adder $26_1$ for adding the first input datum $F_1$ and the conjugate complex datum $F_{8-1}^*$ to produce a first total $2H_1$, a second complex adder $26_2$ for adding the second input datum $F_2$ and the conjugate complex datum $F_{8-2}^*$ to produce a second total $2H_2$, a third complex adder $26_3$ for adding the third input datum $F_3$ and the conjugate complex datum $F_{8-3}^*$ to produce a third total $2H_3$, and a fourth complex adder $26_4$ for adding the fourth input datum $F_4$ and the conjugate complex datum $F_{8-4}^*$ to produce a fourth total $2H_4$. The second conjugate component extractor 22 comprises a zeroth conjugate complex circuit $27_0$ responsive to the fourth total $2H_4$ for producing the conjugate complex datum $2H_4^*$ thereof, namely, $2H_{4-0}^*$, a first conjugate complex circuit $27_1$ responsive to the third total $2H_3$ for producing the conjugate complex datum $2H_3^*$ or $2H_{4-1}^*$, a second conjugate complex circuit $27_2$ responsive to the second total $2H_2$ for producing the conjugate complex datum $2H_2^*$ or $2H_{4-2}^*$, a zeroth complex adder $28_0$ for adding the zeroth total $2H_0$ and the conjugate complex datum $2H_{4-0}^*$ to produce a zeroth sum $2A_0$ in compliance with Equation (6), a first complex adder $28_1$ for adding the first total $2H_1$ and the conjugate complex datum $2H_{4-1}^*$ to produce a first sum $2A_1$, a second complex adder $28_2$ for adding the second total $2H_2$ and the conjugate complex datum $2H_{4-2}^*$ to produce a second sum $2A_2$, a zeroth complex subtractor $29_0$ for subtracting the conjugate complex datum $2H_{4-0}^*$ from the zeroth total $2H_0$ to produce a zeroth difference $2B_0$, and first and second subtractors $29_1$ and $29_2$ for similarly producing first and second differences $2B_1$ and $2B_2$. For convenience, the totals $2H_0$ through $2H_4$ are labelled in FIG. 2 by the first conjugate components $H_0$ through $H_4$ while the sums and differences $2A_0$ through $2A_2$ and $2B_0$ through $2B_2$, by the second conjugate components $A_0$ through $A_2$ and $B_0$ through $B_2$.

Further referring to FIG. 2 and FIG. 3(a), the arithmetic unit 23 comprises zeroth through second factor input terminals $31_0$, $31_1$, and $31_2$ supplied with predetermined factors $j\exp(j[2\pi/8] \times 0)$, $j\exp(j[2\pi/8] \times 1)$, and $j\exp(j[2\pi/8] \times 2)$, respectively, zeroth through second complex multipliers $32_0$, $32_1$, and $32_2$ for multiplying the zeroth through second differences $2B_0$ through $2B_2$ by the zeroth through second factors, respectively, to derive zeroth through second complex products, a zeroth complex adder $33_0$ for adding the zeroth sum $2A_0$ and the zeroth product to produce a zeroth result $2G_0$ with reference to Equation (5), first and second complex adders $33_1$ and $33_2$ for likewise deriving first and second results $2G_1$ and $2G_2$, a subtractor 34 for subtracting the first product $2jB_1 \cdot \exp(j[2\pi/N])$ from the first sum $2A_1$, and a conjugate complex circuit 35 for calculating the conjugate complex datum of the output of the subtractor 34 to produce a third result $2G_1^*$ or $2G_3$. Although first and second subtractors $36_8$ and $36_9$ and first and second conjugate complex circuits $37_8$ and $37_9$ connected thereto, respectively, are depicted, first and second additional results $2G_4^*$ and $2G_2^*$ thereby produced are equal to the zeroth and the second results $2G_0$ and $2G_2$, respectively. The scaling circuit 24 comprises zeroth through third real multipliers $39_0$, $39_1$, $39_2$, and $39_3$ for multiplying the first through third results $2G_0$ through $2G_3$ by $\frac{1}{2}$. Each of the multipliers 39 (suffixes omitted) may be a known scaler for shifting by one bit a binary number to less significant digits. As will readily be understood, the scaling circuit 24 may be interposed between the first and second extractors 21 and 22 or between the second extractor 22 and the arithmetic unit 23.

Figure 5:
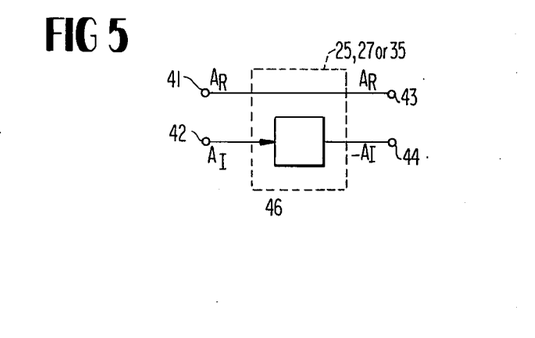
FIG. 5 is a block diagram of a circuit used in the pre-processor shown in FIG. 2 for calculating a conjugate complex datum.

Turning to FIG. 5, a conjugate complex circuit 25, 27, 35, or 37 (suffixes omitted) has real and imaginary input terminals 41 and 42 and real and imaginary output terminals 43 and 44. A real part $A_R$ of a complex input datum A is supplied from the real input terminal 41 directly to the real output terminal 43. An imaginary part $A_I$ of the input datum A supplied to the imaginary input terminal 42 is delivered to the imaginary output terminal 44 through a polarity inverter 46 as an imaginary part $-A_I$ of the conjugate complex datum A*, which is defined by $A_R - jA_I$.

Figure 6:
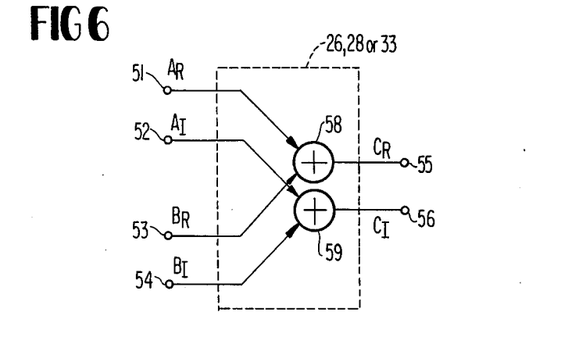
FIG. 6 is a block diagram of a complex adder used in the pre-processor exemplified in FIG. 2.

Referring to FIG. 6, a complex adder 26, 28, or 33 (suffixes omitted) has first real and imaginary input terminals 51 and 52 for a first complex input datum A, second real and imaginary input terminals 53 and 54 for a second complex input datum B, and real and imaginary output terminals 55 and 56 for a complex sum C. A first adder 58 adds real parts $A_R$ and $B_R$ of the first and second input data A and B to produce a real part $C_R$ of the sum C. A second adder 59 produces an imaginary part $C_I$ of the sum C in response to imaginary parts $A_I$ and $B_I$ of the first and second data A and B. A complex subtractor 29 or 34 (suffixes omitted) is similar in structure. Incidentally, the adders 58 and 59 may be of the structure of an adder described in the book cited hereinabove with reference to FIG. 8.20 (page 506).

Figure 7:
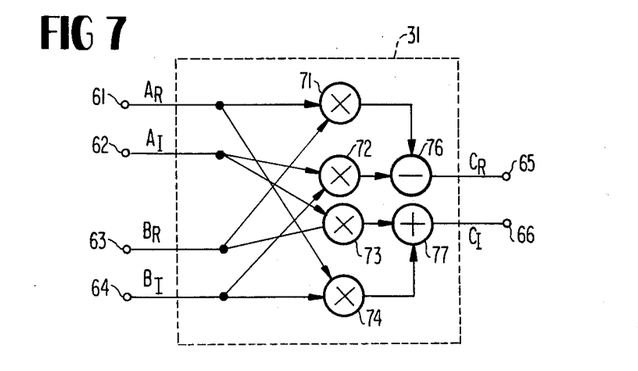
FIG. 7 is a block diagram of a complex multiplier used in the pre-processor illustrated in FIG. 2.

Referring to FIG. 7, a complex multiplier 32 (suffix omitted) has first real and imaginary input terminals 61 and 62 for a first complex input datum A, second real and imaginary input terminals 63 and 64 for a second complex input datum B, and real and imaginary output terminals 65 and 66 for a complex product C. A first multiplier 71 calculates a first product of real parts $A_R$ and $B_R$ of the first and second data A and B. A second multiplier 72 calculates a second product of imaginary parts $A_I$ and $B_I$ of the input data A and B. A third multiplier 73 calculates a third product of the imaginary part $A_I$ and the real part $B_R$ while a fourth multiplier 74, a fourth product $A_R B_I$. A subtractor 76 subtracts the second product $A_I B_I$ from the first product $A_R B_R$ to produce the difference as a real part $C_R$ of the complex product C. An adder 77 adds the third and fourth products $A_R B_I$ and $A_I B_R$ to derive the sums as an imaginary part $C_I$ of the complex product C. Incidentally, the multipliers 71 through 74 may be similar to an add-shift multiplier illustrated in the book referenced hereinabove with reference to FIG. 8.20 (page 516).

Turning back to FIG. 2, a pre-processor 11 for use in a DFT calculator for producing real parts $f_n^R$ of DFT's $f_n$ of the N-point complex input data $F_k$ should have the factor input terminals 31 (suffixes omitted) supplied with predetermined factors $j\exp(-j[2\pi/N]p)$ instead of the factors $j\exp(j[2\pi/N]p)$. This is achieved by merely changing the signals supplied to the input terminals 31.

Referring again to FIG. 2, a pre-processor 11 for use in making a DFT calculator produce the imaginary parts $f_n^I$ of DFT's or IDFT's of the N-point complex input data $F_k$ according to the second embodiment of this invention should produce the N/2-point complex intermediate data $G_p$ using a truncated sequence of the first conjugate components $H_m$ of antisymmetry defined by Equation (7a). For this purpose, the complex adders 26 should be understood to be complex subtractors for subtracting the conjugate complex data $F_{N-k}^*$ from the complex input data $F_k$, respectively. Furthermore, it is necessary at first to multiply the second conjugate components of the symmetric sequence $A_p$ by predetermined factors $\exp(-j[2\pi/N]p)$ or $\exp(j[2\pi/N]p)$. Zeroth through second connections $81_0$, $81_1$, and $81_2$ should therefore be understood to comprise complex multipliers which are equivalent to the complex multipliers 32 and supplied from the respective factor input terminals 31. Instead, the illustrated complex multipliers 32 should be understood to be simple multipliers which are not supplied from the factor input terminals 31 but multiply the second conjugate components of the antisymmetric sequence $B_p$ merely by the imaginary unit $(-j)$. Such a simple multiplier is not one for complex data but a circuit, such as a conjugate complex circuit shown in FIG. 5, whereby a real part $A_R$ of a complex input datum A is produced as an imaginary part $A_I'$ (not shown) of a complex output datum A' without any change while an imaginary part $A_I$ of the input datum A is produced as a real part $A_R'$ of the output datum A' with the polarity inversed by a polarity inverter, such as that depicted in FIG. 5 at 46. In the second place, the subtractors 29 should subtract the complex products supplied thereto through the connections 81 (suffixes omitted) from the second conjugate components multiplied by the imaginary unit to become $-jB_p$.

Referring once again to FIG. 2, it is to be noted that Equation (11) for $p=0$ and $N/4$ are, if use is made of the nature of Modulo N of the complex input data $F_k$:

$$G_0=(\tfrac{1}{4})[(F_0+F_N{}^*)+(F_{N/2}{}^*+F_{N/2})+j(-[F_0+F_N{}^*]-[F_{N/2}{}^*+F_{N/2}])\cdot\exp(j\times 0)]=Re[-F_0]+Re[F_{N/2}]+j(Re[F_0]-Re[F_{N/2}]) \quad (16)$$

and $$G_{N/4}=(\tfrac{1}{4})[(F_{N/4}+F_{3N/4}{}^*)+(F_{N/4}{}^*+F_{3N/4})+j([F_{N/4}+F_{3N/4}{}^*]-[F_{N/4}{}^*+F_{3N/4}])\cdot\exp(j[\pi/2])]=F_{N/4}{}^*+F_{3N/4}. \quad (17)$$

It should also be noted that the complex multiplications for the second conjugate components $A_0$ or $B_0$ and $A_{N/4}$ or $B_{N/4}$ are by 1 and $-j$ for DFT's and IDFT's. It is therefore possible to simplify the circuitry of the pre-processor 11. More specifically for $N=8$ depicted in FIG. 2, it is possible according to Equation (16) to dispense with the circuit elements $25_0$, $25_4$, $26_0$, $26_4$, $27_0$, $28_0$, $29_0$, $31_0$, $32_0$ (or $81_0$), $33_0$, $34_0$, $35_0$, and $39_0$ for the zeroth and the fourth or N/2-th input data $F_0$ and $F_{N/2}$ ($F_4$) and instead to use an adder for adding the real parts of the input data $F_0$ and $F_{N/2}$ supplied to the input terminals $10_0$ and $10_{N/2}$ ($10_4$) to provide the real part of the zeroth intermediate datum $G_0$ and a subtractor for subtracting the real part of the N/2-th input datum $F_{N/2}$ from the real part of the zeroth one $F_0$ to provide the imaginary part of the intermedate datum $G_0$. Although an adder and a subtractor for real parts alone have not been discribed in conjunction with FIG. 2, they should be understood to be depicted as the adder $28_0$ or $33_0$ and the subtractor $29_0$ or $34_0$. For Equation (17), it is possible to dispense with the second or N/4-th conjugate complex circuit $25_{N/4}$ ($25_2$) connected to the $N_{3N/4}$-th input terminal $10_{3N/4}$ ($10_6$) and to understand a connection 82 between the N/4-th input terminal $10_{N/4}$ ($10_2$) and the N/4-th complex adder $26_{N/4}$ ($26_2$) to comprise a conjugate complex circuit, such as $25_2$. The circuit elements interposed between the complex adder $26_{N/4}$ and the N/4-th output lead $12_{N/4}$ ($10_2$) for the N/4-th and 3N/4-th input data $F_{N/4}$ and $F_{3N/4}$ are unnecessary. Even when the number of points N of the input data $F_k$ is equal to an odd integral multiple of two, Equation (16) also holds. Circuit elements illustrated in FIG. 2 for the N/4-th intermediate datum $G_{N/4}$ are unnecessary.

As regards the first and second extractors 21 and 22 of the pre-processor 11 illustrated with reference to FIG. 2, it should be noted in connection with Equation (6) that the first conjugate components $H_s$ in a latter half of the truncated sequence ($s=N/4, \ldots, N/2-1$, and $N/2$) are always subjected to calculation of the conjugate complex data $H_s{}^*$. Modification of the first extractor 21 is therefore possible so as to calculate $H_s{}^*$ instead of $H_s$. It may be mentioned in this connection that:

$$H_s{}^*=(\tfrac{1}{2})(F_{N-s}{}^*+F_s). \quad (18)$$

Comparison of Equation (18) with Equation (7) or (7a) readily reveals that calculation of the conjugate complex data of the latter-half conjugate symmetric or antisymmetric components $H_s{}^*$ is possible by merely connecting in the first extractor 21 the (N−s)-th conjugate complex circuits $25_{N-s}$ to the (N−s)-th input terminals $10_{N-s}$ rather than to the s-th input terminals $10_s$. Under the circumstances, a connection 83 between the (N−s)-th input terminal $10_{N-s}$ ($10_3$) and the (N−s)-th complex adder $26_{N-s}$ ($26_3$) should be understood to comprise such a circuit $25_{N-s}$ with the illustrated conjugate complex circuit $25_3$ removed. With this modification of the first extractor 21, the (N/2−s)-th conjugate complex circuits $27_{N/2-s}$ ($27_1$) in the second extractor 22 turns out to be unnecessary. In connection with the above, it should be understood that a truncated sequence of first conjugate components $H_m$ of symmetry or antisymmetry may consist of first-part components $H_0$, $H_1$, $\ldots$, and $H_{[N/4]}$ and latter-part components $H_{[N/4]+1}{}^*, \ldots, H_{N/2-1}{}^*$, and $H_{N/2}{}^*$. When the number of points N is equal to an even integral multiple of two, the N/4-th conjugate symmetric or antisymmetric component $N_{N/4}$ may be the conjugate complex component $H_{N/4}{}^*$.

As has thus far been described, a DFT calculator according to this invention enables DFT's for IDFT's to be calculated with the number of times of multiplication reduced to about ¼ and ½ as compared with a sophisticated DFT calculator and an FFT calculator, respectively. The calculation is therefore accomplished with a speed of about four times and twice, respectively.

What is claimed is:

1. A discrete Fourier transform calculator responsive to a sequence of N-point discrete complex input data, where N is representative of an even number, for producing a prescribed one of a sequence of real parts of N-point discrete Fourier transforms of said input data, a sequence of imaginary parts of said Fourier transforms, a sequence of real parts of N-point inverse discrete Fourier transforms of said input data, and a sequence of imaginary parts of said inverse discrete Fourier transforms, said calculator comprising:

a pre-processor responsive to said input data for producing a sequence of N/2-point complex intermediate data, said pre-processor comprising, in turn:

first means for extracting from said input data a truncated sequence of first conjugate components of one of symmetry and antisymmetry that is selected according as said real parts of said discrete Fourier transforms and said inverse discrete Fourier transforms are to be produced and said imaginary parts of said discrete Fourier transforms and said inverse discrete Fourier transforms are to be produced, respectively;

second means for extracting from said first conjugate components a symmetric sequence of second conjugate components and an antisymmetric sequence of second conjugate components; and third means for calculating complex products of factors selected according as said real and imaginary parts of said discrete Fourier transforms and said real and imaginary parts of said inverse discrete Fourier transforms are to be produced and the second conjugate components of one of said symmetric and antisymmetric sequences that is selected according as said real parts of said discrete Fourier transforms and said inverse discrete Fourier transforms and said imaginary parts of said discrete Fourier transforms and said inverse discrete Fourier transforms are to be produced, respectively, first algebraic sums of said complex products and the respective second conjugate components of the other of said symmetric and antisymmetric sequences, second algebraic sums of said complex products and the respective second conjugate components of said other sequence, and conjugate complex data of said second algebraic sums, said first algebraic sums and said conjugate complex data providing said N/2-point complex intermediate data; and an N/2-point discrete Fourier transform calculating circuit having real output terminals N/2 in number, and imaginary output terminals, also N/2 in number, responsive to said N/2-point complex intermediate data supplied thereto as N/2-point complex input data for supplying said real and imaginary output terminals with the transforms of said prescribed sequence.

2. A discrete Fourier transform calculator as claimed in claim 1, said calculator being adapted to production of a selected one of said sequence of the real parts of said discrete Fourier transforms and said inverse discrete Fourier transforms, wherein:

said first means comprises means for producing, as said truncated sequence of first conjugate components of one of symmetry and antisymmetry, a first truncated sequence of conjugate symmetric components of said N-point input data;

said second means comprising means for producing a second truncated sequence of conjugate symmetric components of said first truncated sequence and a second truncated sequence of conjugate antisymmetric components of said first truncated sequence as said symmetric and antisymmetric sequences, respectively;

said third means comprising means for calculating said complex products by multiplying the conjugate antisymmetric components of said second truncated sequence by the factors selected according as the real parts of said discrete Fourier transforms and said inverse discrete Fourier transforms are to be produced, means for calculating said first algebraic sums by adding said complex products to the respective conjugate symmetric components of said second truncated sequence, means for calculating said second algebraic sums by subtracting said complex products from the respective conjugate symmetric components of said second truncated sequence to provide complex differences, and means for calculating said conjugate complex data by calculating conjugate complex data of the respective complex differences.

3. A discrete Fourier transform calculator as claimed in claim 1, said calculator being adapted to production of a selected one of said sequences of the imaginary parts of said discrete Fourier transforms and said inverse discrete Fourier transforms, wherein:

said first means comprises means for producing, as said truncated sequence of first conjugate components of symmetry and antisymmetry, a first truncated sequence of conjugate antisymmetric components of said N-point input data;

said second means comprising means for producing a second truncated sequence of conjugate symmetric components of said first truncated sequence and a second truncated sequence of conjugate antisymmetric components of said first truncated sequence as said symmetric and antisymmetric sequences, respectively;

said third means comprising means for calculating said complex products by multiplying the conjugate symmetric components of said second truncated sequence by the factors selected according as the imaginary parts of said discrete Fourier transforms and said inverse discrete Fourier transforms are to be produced, means for calculating said first algebraic sums by subtracting said conjugate antisymmetric components of said second truncated sequence from the respective complex products, means for calculating said second algebraic sums by adding said complex products to the respective conjugate antisymmetric components of said second truncated sequence to provide complex sums, and means for calculating said conjugate complex data by calculating conjugate complex data of the respective complex sums.

* * * * *